United States Patent
Buckner et al.

(10) Patent No.: US 6,523,907 B1
(45) Date of Patent: Feb. 25, 2003

(54) APPARATUS AND METHOD FOR PRODUCING BRUSHWARE BY INJECTION MOLDING

(75) Inventors: Carroll Buckner, Morristown, TN (US); James Collins, Greeneville, TN (US); Kenan Bible, Del Rio, TN (US); Lloyd Etter, Morristown, TN (US); David E. Harris, Kingsport, TN (US)

(73) Assignee: Moll Industries, Inc., Morristown, TN (US)

( * ) Notice: Subject to any disclaimer, the term of this patent is extended or adjusted under 35 U.S.C. 154(b) by 0 days.

(21) Appl. No.: 09/494,946

(22) Filed: Feb. 1, 2000

(51) Int. Cl.[7] ................................. A46D 3/00
(52) U.S. Cl. ..................... 300/2; 300/21; 264/243; 425/123; 425/805
(58) Field of Search .................. 300/2, 4, 5, 8–11, 300/21; 264/243, 250; 425/123, 126.1, 129.1, 130, 317, 805

(56) References Cited

U.S. PATENT DOCUMENTS

| | | | | |
|---|---|---|---|---|
| 2,298,156 A | * | 10/1942 | Person | 300/21 X |
| 2,317,110 A | | 4/1943 | Person | 264/243 |
| 2,655,409 A | | 10/1953 | Baldanza | 300/21 |
| 2,923,035 A | | 2/1960 | Schwartz | 264/247 |
| 3,408,112 A | * | 10/1968 | Piotrowski | 300/21 |
| 4,609,228 A | | 9/1986 | Bickel | 300/4 |
| 4,635,313 A | | 1/1987 | Fassler et al. | 15/193 |
| 4,652,227 A | | 3/1987 | Aoki | 425/191 |
| 4,892,698 A | | 1/1990 | Weihrauch | 264/243 |
| 4,979,782 A | | 12/1990 | Weihrauch | 300/4 |
| 5,045,267 A | | 9/1991 | Weihrauch | 264/243 |
| 5,087,403 A | | 2/1992 | Weihrauch | 264/157 |
| 5,143,424 A | | 9/1992 | Boucherie | 300/2 |
| 5,256,048 A | | 10/1993 | Jacobs et al. | 425/130 |
| 5,390,984 A | * | 2/1995 | Boucherie | 300/21 |
| 5,454,626 A | | 10/1995 | Schiffer et al. | 300/21 |
| 5,458,400 A | | 10/1995 | Meyer | 300/21 |
| 5,474,366 A | | 12/1995 | Strütt et al. | 300/21 |
| 5,533,791 A | | 7/1996 | Boucherie | 300/4 |
| 5,609,890 A | | 3/1997 | Boucherie | 425/120 |
| 5,728,408 A | * | 3/1998 | Boucherie | 264/243 X |
| 5,823,633 A | | 10/1998 | Weihrauch | 300/21 |
| 6,290,302 B1 | * | 9/2001 | Boucherie | 300/21 X |
| 6,290,303 B1 | * | 9/2001 | Boucherie | 300/5 |

FOREIGN PATENT DOCUMENTS

| | | | | |
|---|---|---|---|---|
| DE | 845933 | | 6/1953 | |
| DE | 29 22 877 | | 12/1980 | |
| DE | 34 08 451 | | 7/1985 | |
| DE | 3832520 | * | 4/1990 | 300/21 |
| DE | 4034811 | * | 5/1992 | 300/2 |
| DE | 41 27 621 | | 2/1993 | |
| DE | 42 43 293 | | 6/1994 | |
| EP | 0 326 634 | | 2/1988 | |
| EP | 0 710 534 | | 9/1995 | |
| FR | 1453829 | * | 9/1966 | 300/21 |
| GB | 708733 | * | 5/1954 | 300/21 |
| GB | 790151 | * | 2/1958 | 300/21 |
| JP | 5-115325 | * | 5/1993 | 300/21 |
| WO | 89/06920 | * | 8/1989 | 300/21 |
| WO | 99/01055 | | 1/1999 | |

* cited by examiner

*Primary Examiner*—Mark Spisich
(74) *Attorney, Agent, or Firm*—Choate, Hall & Stewart; Valarie B. Rosen

(57) ABSTRACT

An apparatus and method for producing brushes. The bristle bundles are loaded into a magazine which includes part of a cavity for an injection mold. The magazine is mated with the remainder of the injection mold and the brush handle injection molded around the bristles. The bristles may be profiled, trimmed, end-rounded, fused, or otherwise processed before the handle is injection molded. In addition, the handle of the brush may be formed in two injection molding steps of two different materials. An apparatus is taught which enables the brush to be produced, optionally ornamented, and packaged on a single machine.

24 Claims, 16 Drawing Sheets

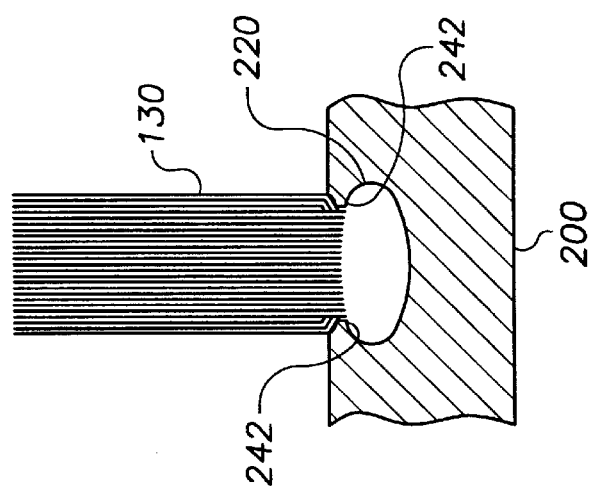
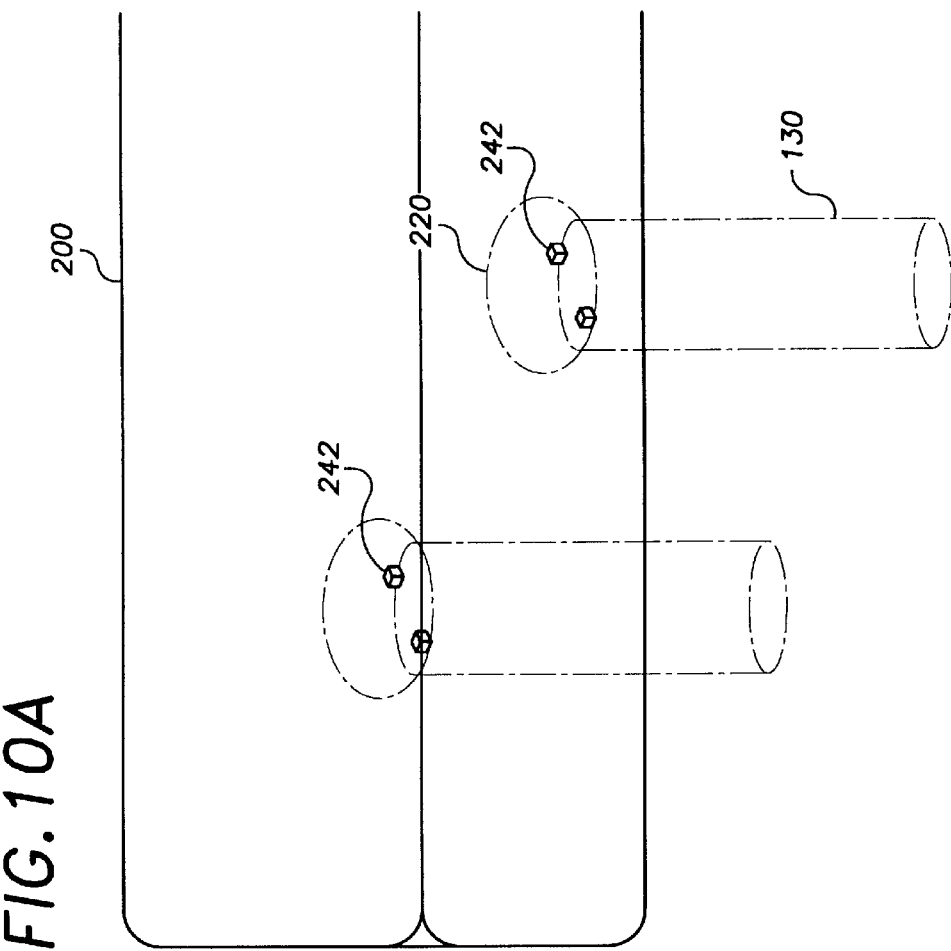

APPARATUS AND METHOD FOR PRODUCING BRUSHWARE BY INJECTION MOLDING

FIELD OF THE INVENTION

This invention is related to methods for producing brushware by injection molding, specifically methods of producing brushware by in-mold bristling techniques.

BACKGROUND OF THE INVENTION

The variety of brands, designs, and styles of toothbrushes available in the United States today is truly staggering. Brushes are available in sizes and styles appropriate for babies, adults, dentures, sensitive gums, and other specialized needs. Brushes can be had in every color of the rainbow and decorated with logos ranging from mermaids and cartoon characters to trade names of various kinds. Most brushes are produced via a two part technique. The handles are produced by injection molding, and the bristles are later inserted into a head portion of the handle. One common technique for inserting the bristles into the brushes is to staple them. Bristles are folded around a metal staple which is pushed into pre-molded holes in the brush. The staple cuts its way into the brush handle, which holds it and the bristles securely. However, rough use can easily remove the bristles from the handle, leading to shedding, or, in a worst case scenario, release of the metal staple inside the mouth.

Techniques wherein the bristles are fused with the handles can be used to produce brushes where the bristles are much harder to remove from the brush. Either the bristles or the brush head, or both, are heated, and the bristles are inserted into holes in the handle, where they are retained by the cooling plastic. Exemplary techniques for brush production by fusion, such as those disclosed in U.S. Pat. Nos. 4,609,228 and 4,646,381, produce brushes with high bristle retention strength but retain the economic disadvantage that the brush is produced in a two-part process on two different machines. That is, the handles are still produced on a different machine than the one on which the bristles are inserted into the handle. It is thus desirable to produce a toothbrush using techniques which minimize the apparatus used, and consequently, the amount of time and number of personnel required to produce the brushes.

In-mold bristling processes, wherein the handle of the brush is injection molded around the bristles, have been used to produce a variety of different brushes. For example, U.S. Pat. No. 4,635,313 (the '313 patent) to Fassler, describes an in-mold bristling process wherein the ends of the bristles are fused prior to the injection molding of the handle. The illustrative drawing on the front page of the patent shows a nail brush; however, the technique can also be used to produce toothbrushes. One concern in the production of brushes by this technique is the penetration ("flash") of injection molded material through the bristle bundles into the face of the brush. This is not only unsightly but unhygienic because the excess material provides an excellent hiding place for bacteria and mold. To prevent this, the '313 patent describes a method of sealing the opening of the injection mold through which the bristles enter the mold with a melted fuse at the end of the bristle bundles. U.S. Pat. No. 5,045,267 (the '267 patent) to Weihrauch discloses a variation of the in-mold bristling technique described in the '313 patent. However, in the '267 patent, the fused ends of the bristle bundles are pulled against sleeves projecting from the end of the channels which lead into the mold. The tensile force holding the fuse against the sleeve further discourages injection molded material from penetrating the bristle bundles.

U.S. Pat. No. 5,143,424 to Boucherie also describes an in-mold bristling process. Bristles are loaded into one end of a two-ended magazine while, at the other end, the handle material is simultaneously injection molded into a previously loaded second end of the magazine. Each of the two ends of the magazine can hold the bristles for a single brush and mate with an injection mold to complete a mold cavity into which the handle is injection molded.

U.S. Pat. No. 5,823,633 to Weihrauch describes an in-mold bristling process similar to that described by the '267 patent. However, in this invention, the fuseballs are not brought into sealing contact with the sleeve. Instead, they are maintained at a finite distance, between 0.1 mm and 2.0 mm, from the opening of the channel, allowing air to escape from the mold cavity through the channel. The gap increases the depth of the fuses within the handle, reinforcing the length of bristle bundle material immediately adjacent to the fuse and increasing the force required to remove the bristle bundles from the brush handle. However, this technique also allows injection molded material to penetrate the bristle bundle and flash over the head of the brush.

U.S. Pat. Nos. 5,458,400 to Meyer and 5,474,366 to Strütt, et al., describe techniques wherein a first section of the brush, including a portion of the head and at least part of the handle is injection molded before the bristles are inserted into the mold. The bristle bundles are inserted into holes in the first brush section, after which the rest of the brush is injection molded.

U.S. Pat. No. 5,609,890 to Boucherie describes an in-mold bristling process wherein the handle comprises two materials instead of a single injection molded material. The invention utilizes a molding machine which comprises at least two injection molding stations and a tuft feeding station. At the feeding station, the bristles are fed into a magazine, following which the ends of the bristles are fused. The magazine, which includes part of a mold cavity, is mated with the rest of an injection mold, completing the mold cavity. The first section of the brush, including the head, is injection molded, following which the magazine, still carrying the first injection molded section of the brush, is transferred to a second injection mold, whereat the remainder of the brush is injection molded.

SUMMARY OF THE INVENTION

In one aspect, the invention is a method for manufacturing brushes. The method includes the steps of inserting a plurality of bristle bundles into a first mold cavity in a magazine, manipulating at least one end of the bristle bundles, mating the first mold cavity portion with a second injection mold cavity portion in an injection mold, and injection molding at least a portion of a brush handle. The first and second cavity portions define the shape of the portion of the brush handle. The bristles may be inserted into the magazine from an endless supply or a supply of pre-cut bristles.

Manipulating may comprise adjusting the relative heights of the bristle bundles with respect to one another before the first part of the brush handle is injection molded. Within the individual bristle bundles, the relative heights of a portion of the bristles may also be adjusted with respect to each other at this time. A non-use side of the bristle bundles may be trimmed to produce a level plane, and a portion of the bristle bundle may be end-rounded before or following the step of injection molding. Following the initial adjusting step, the relative height of the bristle bundles with respect to one another may be inverted in a further adjusting step. Alternatively, manipulating may include fusing a non-use end of each bristle bundle to form a region having a greater diameter than that of the remainder of the bristle bundle. The fusion may be accomplished thermally or chemically and may be followed by pressing the fused ends against a portion of the first mold cavity portion. Thermal fusion may be accomplished by a contact heater, a non-contact heater, or hot air. If the bristles are fused thermally, they may be partially flattened while the fused ends are still warm. A portion of the brush handle may comprise polypropylene, cellulose propionate acetate, polyethylene terephthalate, or a thermoplastic polymer.

The process may further comprise removing the completed portion of the brush handle from the second mold cavity portion, mating the magazine and the portion of the brush handle with a subsequent mold cavity portion, and injection molding an additional portion of the brush handle. The completed portion of the brush handle and the subsequent mold cavity portion define the shape of the additional portion of the brush handle. The additional portion may comprise a thermoplastic elastomer, polypropylene, cellulose propionate acetate, polyethylene terephthalate, or a thermoplastic polymer. The completed portion of the brush handle may be at least partially supported by the bristle bundles when it is carried by the magazine to the subsequent mold cavity portion, but not all the bristle bundles need be retained in the completed portion of the brush.

The magazine may be arranged and constructed to hold bristle bundles corresponding to a plurality of brushes such that the plurality of brushes can be produced simultaneously. For example, the magazine may be arranged and constructed to hold bristle bundles corresponding to four brushes simultaneously. All of the brushes need not be the same color. The process may further comprise packaging, ornamenting, or labeling the completed brush. Ornamenting may include hot-stamping, stamping a decoration, or applying a label. An insert may be placed into the magazine to be incorporated into the completed brush. The insert may be a metal shank or a plastic insert.

In another aspect, the invention is a magazine for conveying bristle bundles along a brush making apparatus. The magazine includes a mold face, a mold cavity portion disposed in the mold face having the shape of part of a head of the brush, a back side, a clamping plate disposed between the mold face and the back side, and a plurality of channels extending through the magazine into the mold cavity for holding bristle bundles in a configuration corresponding to the desired arrangement of a set of bristle bundles in a brush. The magazine may hold sets of bristle bundles for a plurality of brushes and may be arranged and constructed to clamp and release the set of bristles for each brush independently. For example, the magazine may be arranged and constructed to hold at least four sets of bristle bundles. Each channel may include an opening into the mold cavity portion with a slotted sleeve.

The magazine may further include a detachable trim plate in cooperation with the mold cavity portion. The trim plate includes channels which coincide with the channels through the magazine. A surface of the trim plate may project above the mold face or be flush with the mold face when the plate is in cooperation with the mold cavity portion. When the magazine is seated in an injection molding apparatus, the mold cavity portion of the magazine may cooperate with the mold cavity portion of the apparatus to define a mold cavity having the shape of a portion of the brush. The magazine may further comprise a cut plate mounted on the back side of the magazine with channels coinciding with the channels through the magazine. A portion of the channels may be skewed with respect to one another or lie in intersecting planes.

In another aspect, the invention is a method for processing bristles for a brush. The method comprises holding the bristles in bundles in a magazine, adjusting the relative height of at least a portion of the bristle bundles with respect to one another, trimming non-use ends of at least a portion of the bristle bundles to produce a level plane, heating the non-use ends of the bristle bundles to melt the ends of the bristles, and end-rounding use-ends of the bristle bundles. The step of adjusting may be performed with pins which approach both ends of the bristle bundles. Alternatively, this step of adjusting may comprise providing a plate in cooperation with a side of the magazine such that the plate includes holes in an arrangement corresponding to a configuration of the bristles in the magazine such that each hole ends in a surface corresponding to a desired arrangement of bristle strands or the inverse of the desired arrangements of the bristle strands, and pressing an end of the bristle bundles against the surface in the hole with a pressurized fluid. This step of adjusting may further include adjusting the relative heights of at least a portion of the bristles within the bundles with respect to one another.

After the step of heating and melting the non-use ends of the bristle bundles, the melted portion of the bristle bundles may be flattened or brought into contact with a portion of the magazine, or both. A portion of the bristle bundles may be skewed with respect to one another in the magazine or may lie in intersecting planes. The steps of adjusting and trimming may be repeated, and the step of end-rounding may be performed in several steps. Following the steps of heating and melting the ends of the bristle bundles, a diameter of the melted ends of the bristle bundles may be greater than the diameter of the unmelted portion of the bristle bundles. The step of adjusting may be performed prior or subsequent to the step of end-rounding.

In another aspect, the invention is an apparatus for injection molding a plastic article having at least two components. The apparatus comprises a first and a second injection molding machine each of which comprises at least a first injection unit. The apparatus can be operated in one of two modes. The first mode comprises injection molding a first component of the plastic article at the first injection unit on the first injection molding machine and injection molding a second component of the plastic article at the first injection unit on the second injection molding machine. The second mode comprises injection molding a first component of the plastic article at the first injection unit on the first injection molding machine or the second injection molding machine and injection molding a second component of the plastic article at a second injection unit on the injection molding machine at which the first component was injected. The first component may comprise polypropylene, cellulose propionate acetate, polyethylene terephthalate, or a thermoplastic polymer. The second component may comprise a thermoplastic polymer or a thermoplastic elastomer. The apparatus may comprise first, second, and third injection molding machines. If the apparatus includes a third injection molding machine, the first component may be injection molded in either of the first or second injection molding machines in the first mode.

The apparatus may further include a conveyer system which delivers a holder comprising part of the mold cavity to the injection unit at which the first component is injected and which delivers the holder and the first component of the plastic article to the injection unit at which the second component is injection molded. The apparatus may further include a computer which chooses to which injection unit to send the holder for the first injection molding step and the second injection molding step. At least one of the injection molding machines may comprise first, second, third, and fourth injection units. The first and second injection units may be operated together and the third and fourth injection units may be operated together.

In another aspect, the invention is an apparatus for producing a brush by injection molding. The apparatus includes at least one station at which bristle bundles are fed into channels in a magazine, a station where at the relative heights of the bristle bundles in the magazine are adjusted, a station at which non-use ends of the bristle bundles are trimmed in a level plane, a station at which non-use ends of the bristle bundles are fused, a station at which the use-ends of the bristle bundles are end-rounded, a first injection unit, and a conveyer which transports the magazines to the different stations. At least a portion of the magazine forms part of a mold cavity in the first injection unit. The level plane may be defined by a trim plate in cooperation with the magazine. The apparatus may further comprise a return conveyer to return the trim plate to an unfilled magazine. The bristle bundles may be fed into the magazine from an endless supply, for example, a creel system, or from a pre-cut supply of bristles.

The relative heights of the bristle bundles may be adjusted by pins entering the magazine from a first and a second side. The magazine need not be perpendicular to the pins, and an end surface of a portion of the pins need not be perpendicular to their longitudinal axis. The station at which the relative heights of the bristles are adjusted may include an insert having holes in an arrangement corresponding to the configuration of the bristle bundles in the magazine, wherein the insert is placed in contact with the magazine such that the channels are co-axially aligned with the holes, and a source of pressurized air configured to be in fluidic communication with the channels such that the bristle bundles are interposed between the source of pressurized air and the holes. Each hole ends in a surface corresponding to a desired arrangement of bristle strands or the inverse of the desired arrangement of bristle strands. The relative heights of the individual bristles within the bristle bundles may be adjusted at the station at which the relative heights of the bristle bundles are adjusted. Some of the bristle bundles may be skewed with respect to one another or lie in intersecting planes. The apparatus may comprise at least two stations at which bristle bundle heights are adjusted and two stations where at the bristle bundles are trimmed. If so, then the height adjustment stations and trimming stations alternate such that at least some of the bristle bundles are trimmed before the magazine enters the second height adjustment station.

The apparatus may further comprise a station at which the fused ends of the bristle bundles are flattened or pressed against a portion of the magazine. The apparatus may include a plurality of injection units configured such that the brush is produced from at least two different polymers. The apparatus may comprise a plurality of injection molding machines, each of which may include a plurality of injection units. The injection molding machines may be configured such that the brush is produced from at least two different polymers.

The apparatus may further comprise a packaging system for the completed brush or a station at which the brush can be ornamented or labeled. The apparatus may also include a return conveyer for the used magazine or stations at which the relative heights of the bristle bundles are adjusted prior to or subsequent to the end-rounding station.

BRIEF DESCRIPTION OF THE DRAWING

The invention is described with reference to the several figures of the drawing, in which.

FIG. 10A is a plan view of a toothbrush head;

FIG. 10B is a cross-sectional view of a toothbrush head;

DETAILED DESCRIPTION

Figure 1:
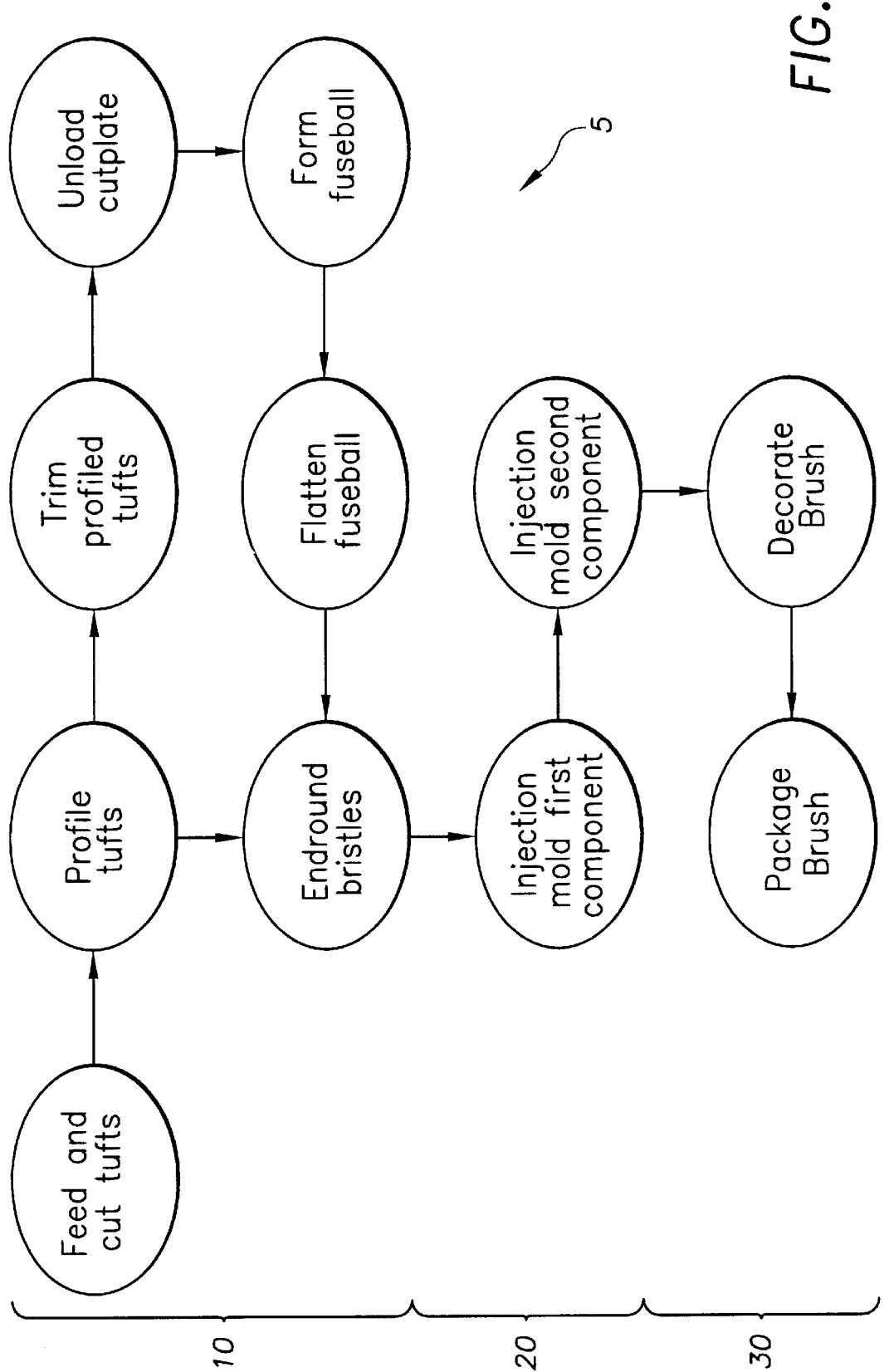
FIG. 1 is a flow chart of the in-mold bristling process.
Figure 2:
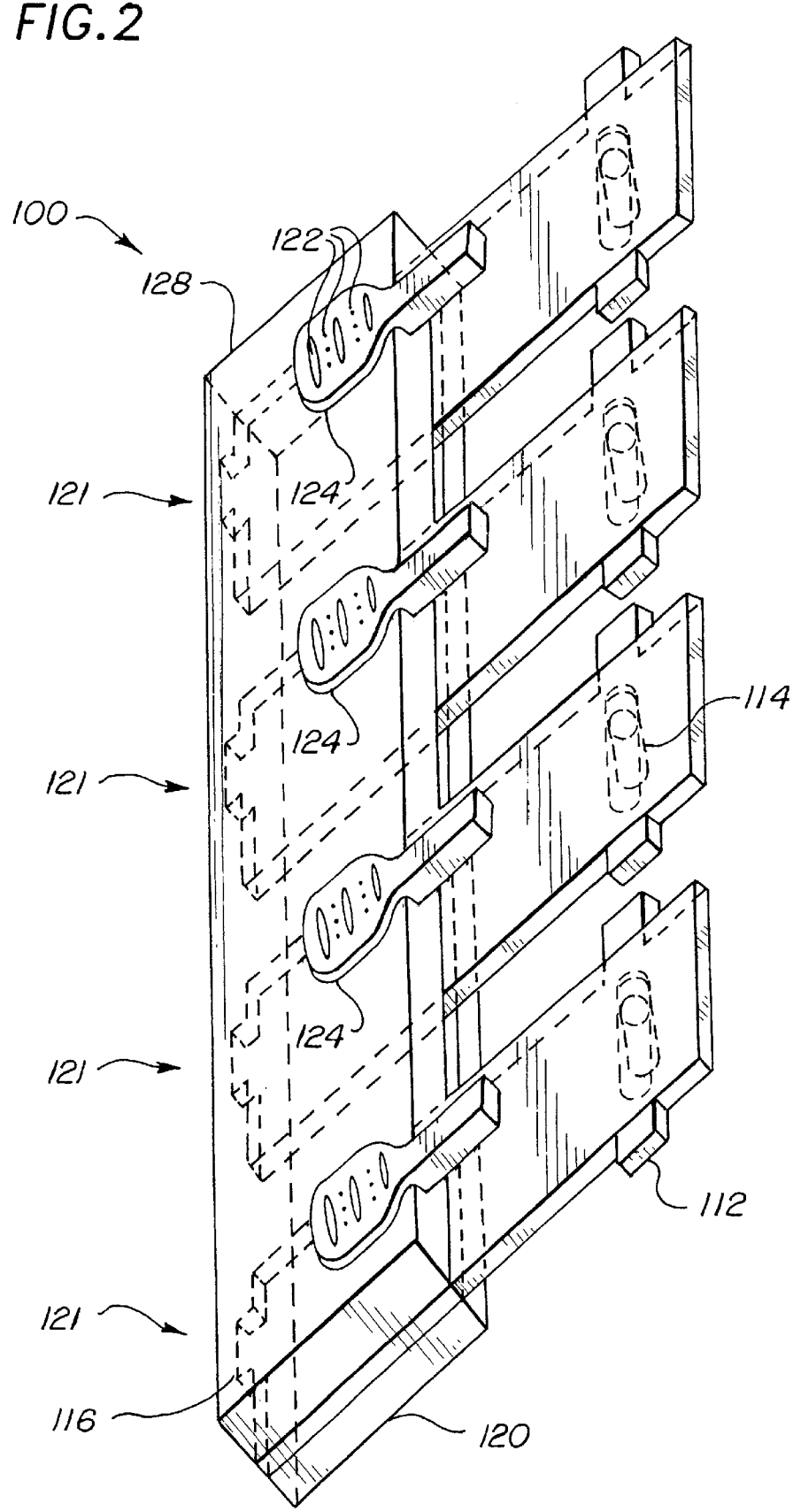
FIG. 2 is a plan view of a magazine which can hold up to four toothbrushes at a time, in which trim plates have been fitted to the magazine.
Figure 3:
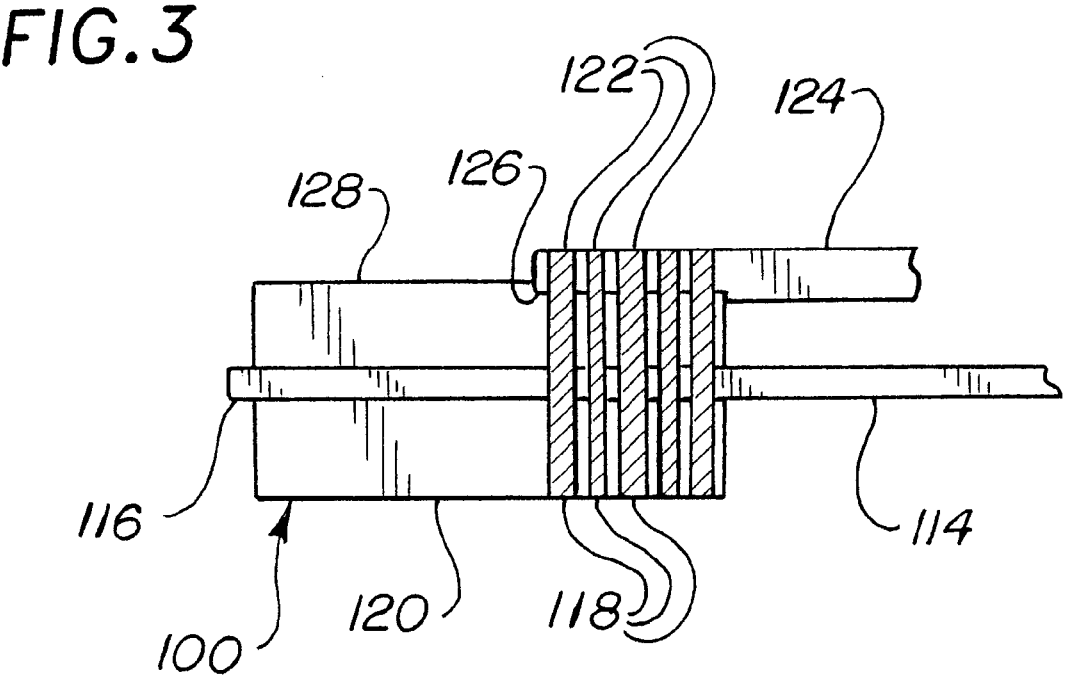
FIG. 3 is a cross-sectional view of the magazine.
Figure 3B:
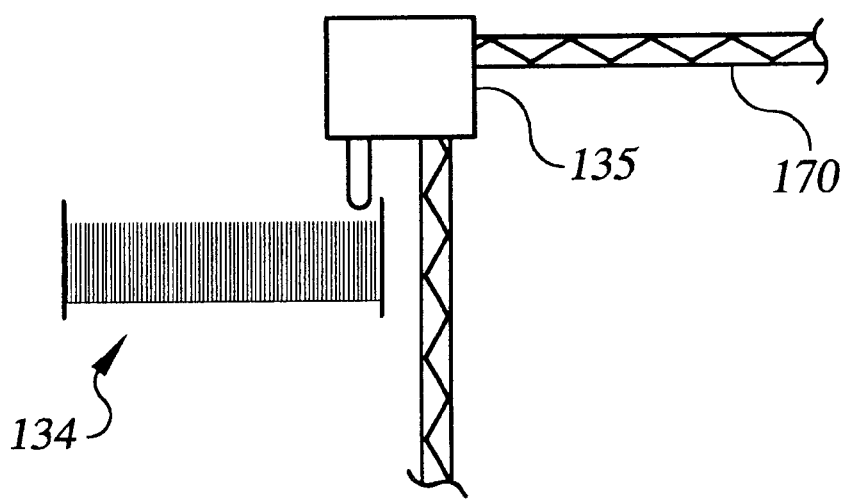
FIG. 3B shows an alternative embodiment of the invention employing a supply of pre-cut bristles.

FIG. 1 is a flow chart showing a summary of an in-mold bristling system 5 according to one embodiment of the invention. The system includes a nylon preparation subsystem 10, an injection molding subsystem 20, and a conveying and packaging subsystem 30. The toothbrushes are carried through the: system 5 by a magazine 100 (FIG. 2), which includes a section of the mold and retaining means for bristle bundles. The magazine can hold bristles for any number of toothbrushes; the embodiment of the magazine shown in FIG. 2 is adapted for production of up to four toothbrushes. Because the bristle bundles for each toothbrush are supported by an individual clamp mechanism, the apparatus of the invention can be operated with magazines that hold any number of toothbrushes from one to six, seven, eight, or even more. The clamp includes a sliding switch 112 which moves a sliding cam action 114 in a brush holding unit 121. FIG. 3 shows a cross section of the magazine 100, including a locking plate 116, which is shown projecting from the magazine 100. The sliding cam action 114 shifts locking plate 116 between an engaged and a disengaged position when moved by sliding switch 112. The locking plate 116 includes holes which, when the locking plate 116 is in a disengaged position, coincide with channels 118 which run through the magazine. Bristle bundles 130 are inserted into channels 118 from an endless supply, for example, creel system 132 (FIG. 3A), and cut at cut plate 120 of magazine 100. In an alternative embodiment, the bristles may be inserted into channel 118 from hanks or other arrangements of pre-cut bristles 134 (FIG. 3B). In addition to the bristles, an insert such as a metal shank, plastic insert, or other non-bristle object may be inserted into the magazine and incorporated into the brush. The bristle bundles penetrate through the channels 118 into channels 122 in trim plate 124, which cooperates with a mold cavity portion 126 cut into a mold side 128 of magazine 100 in the magazine. Channels 122 coincide with the channels 118 through the magazine 100. When locking plate 116 is engaged, the holes in the plate are off-set from channels 118 and clamp the bristle bundles 130 in place. The locking plate 116 can be disengaged and re-engaged to allow the bristle bundles 130 to be moved within the channels 118 or released from the magazine 100 depicted in FIG. 2. Because each brush holding unit 121, depicted in part by switch 112 and locking plate 116, has an individual clamping mechanism, the bristle bundles can be inserted and manipulated for each brush individually.

Figure 4:
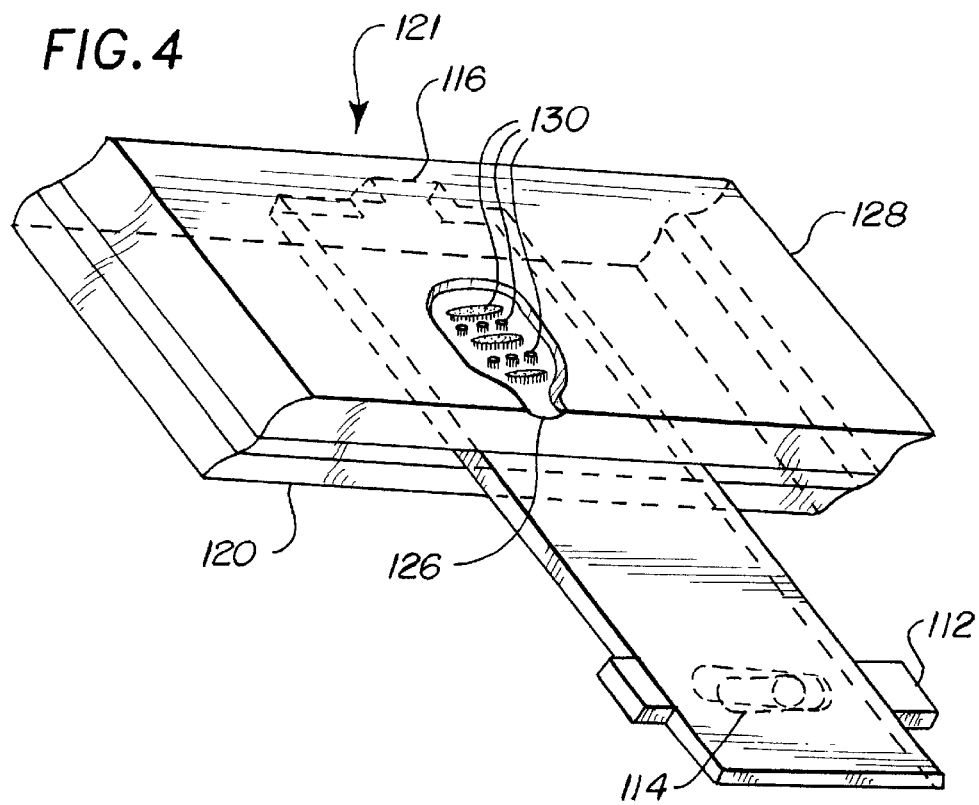
FIG. 4 depicts one unit of the magazine shown in FIG. 2 with bristle bundles inserted into the channels.

FIG. 4 shows the bristle bundles 130 inserted into the channels 118 in one brush holding unit 121 of magazine 100. According to a preferred embodiment of the invention, the bristle bundles 120 are inserted into the magazine 100 at two bristle inserting stations 135 in the nylon preparation unit 10. Bristle bundles 130 are inserted into two of the four brush holding units 121 at one of the stations and into channels 1 18 of the remaining bristle holding units 121 at the second bristle inserting station. Before the magazine 100 travels from the first bristle inserting station to the second bristle inserting station, the bristle bundles 130 for the first two bristle holding units 121 are cut. The bristle bundles 130 for the second two bristle holding units 121 are cut at the second bristle inserting station. While FIG. 2 shows the cut plate 120 as a component of magazine 100, the cut plate may instead be incorporated into a feed guide through which the bristle bundles are initially introduced into the apparatus.

Figure 4A:
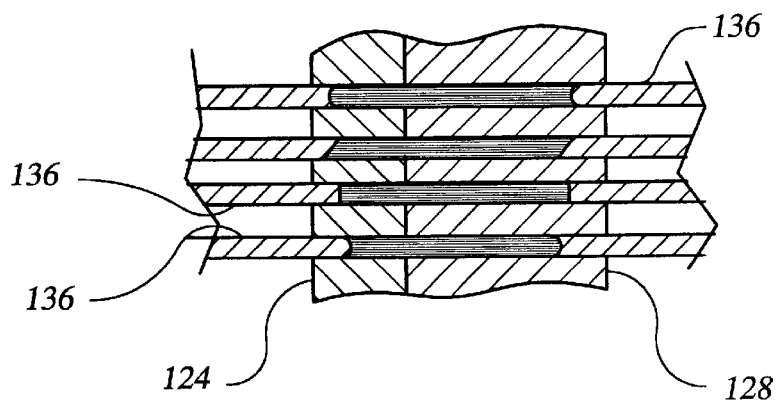
FIG. 4A shows an example of a profiling apparatus for use with the manufacturing processes of the invention.
Figure 5:
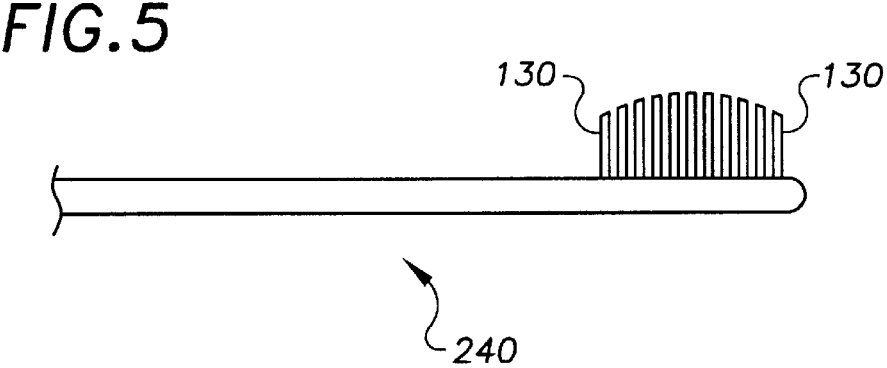
FIG. 5 is a cross-sectional view of a toothbrush.

Once the bristle bundles 130 have been inserted into the magazine 100 and cut from the endless strand, they are shaped and profiled. Pins 136 approach both ends of the cut bundles 130 through channels 118 and 122 and push against the bundles 130, adjusting both the relative bundle height and the surface profile (FIG. 4A). The pins need not be flat. Each individual bristle bundle 130 can have a profile, and overall shape of the collective of bristle bundles 130 may also be contoured. For example, the overall collection of bristle bundles 130 may have a round profile, as shown in FIG. 5. To maintain the profile depicted in FIG. 5, each individual bristle bundle 130 cannot have its ends in a plane parallel to the magazine. Instead, each individual bristle bundle 130 has a contour which conforms to the overall contour of the bristle bundles 130. Of course, the final profile of the brush may be a flat plane.

Figure 4B:
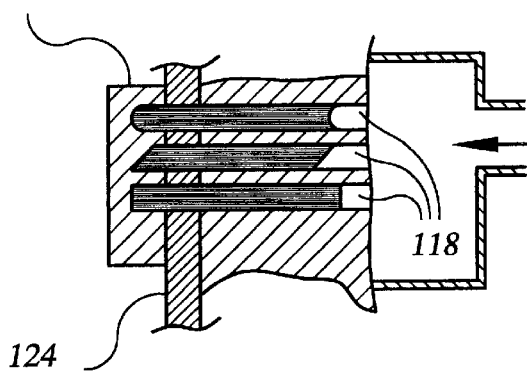
FIG. 4B shows an example of an alternative profiling apparatus for use with the manufacturing processes of the invention.

In an alternative embodiment, the bristle bundles may be profiled with compressed air. Methods for air profiling are well known in the art; one method is disclosed in U.S. Pat. No. 5,454,626 to Schiffer, et al., the contents of which are incorporated herein by reference. A plate is brought in contact with a surface of the magazine. If the plate is brought in contact with the back-side of the magazine 100, into which the use ends of the bristle bundles 130 protrude, then the plate will have holes whose ends are machined to reflect the final profile of the bristles. Pressurized air is directed into the channels 118 and 122, pushing the bristle bundles 130 against the inside of the plate and profiling them. The procedure can be performed in the same manner with a plate abutting the mold cavity side of the magazine 100. In this case, the ends of the holes in the plate 138 are machined to have the reverse of the profile desired for the bristle bundles, and pressurized air 140 is directed into the channels 118 from the back-side of magazine 100 (FIG. 4B).

Indeed, while FIG. 3 shows a series of channels 118 which are all parallel to one another, it is not necessary that the channels 118, 122 or the bristle bundles 130 be so oriented. Individual channels 118, 122 and bristle bundles 130 may be skewed with respect to one another or may lie in intersecting planes.

Figure 6:
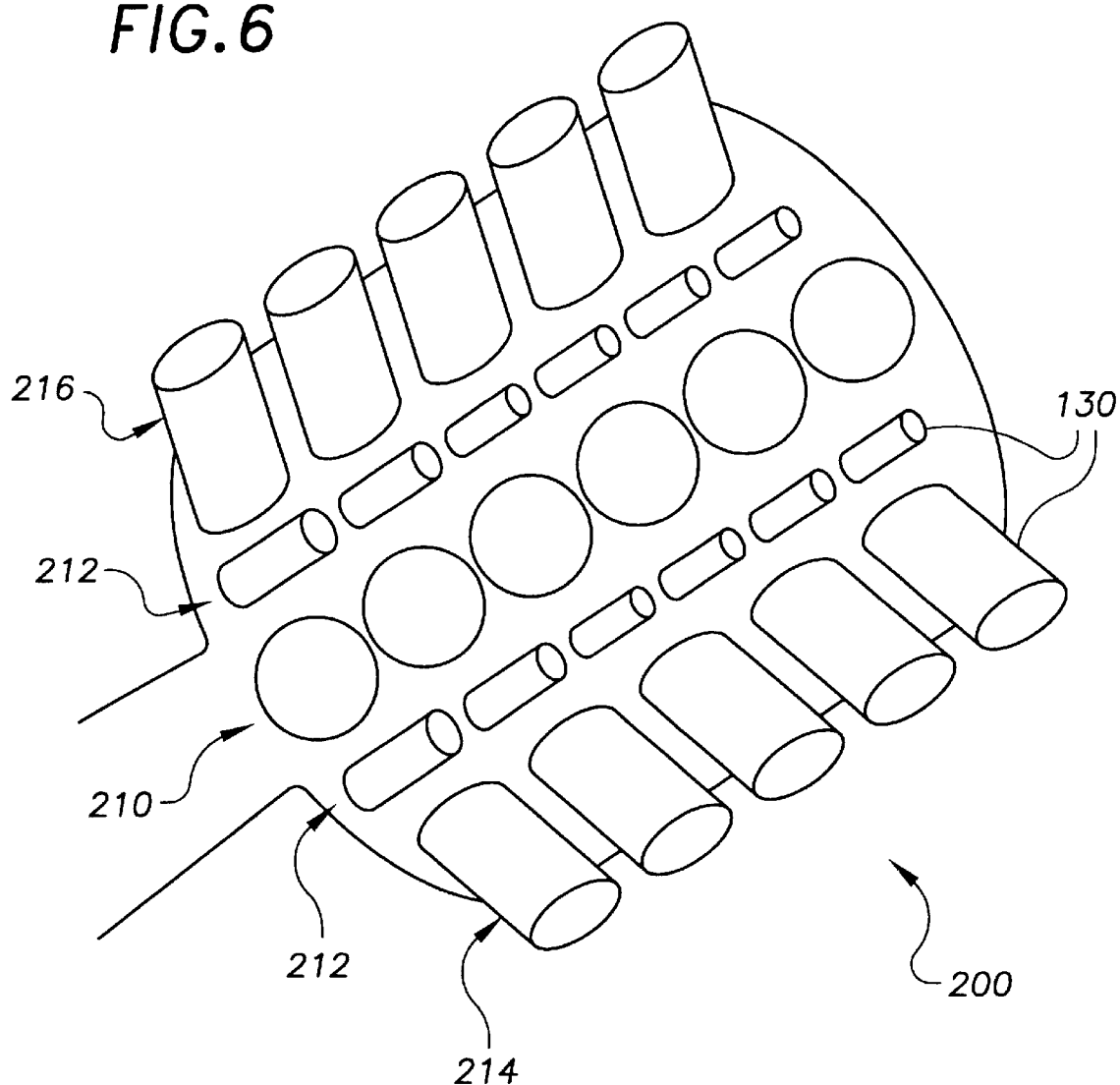
FIG. 6 is a top view of a toothbrush head with the bristle bundles in varying orientations.

For example, FIG. 6 shows a diagram of a brush head 200, including several orientations of bristle bundles 130. The center row of bristle bundles 210 is oriented roughly perpendicularly to the head of the brush. A second group of bristle bundles 212 is situated in a plane parallel to the bristle bundles 210 but in a skewed orientation. That is, the bristle bundles in rows 210 and 212 lie in parallel planes, but the individual bundles in the two groups are not parallel to each other. Third and fourth groups of bristle bundles 214 and 216 lie in planes which intersect not only each other but the planes defined by bristle bundle groups 212 and 210. In general, the bristle bundles 130 can be situated at any orientation with respect to the head 200 of the brush. From the above discussion, it is evident that the invention can be used to produce brushes having a wide variety of bristle bundle sizes, shapes, and arrangements. For example, currently marketed brushes frequently include triangular and elliptical bristle bundles, and the figures depict several different arrangements of bristles.

Figure 3A:
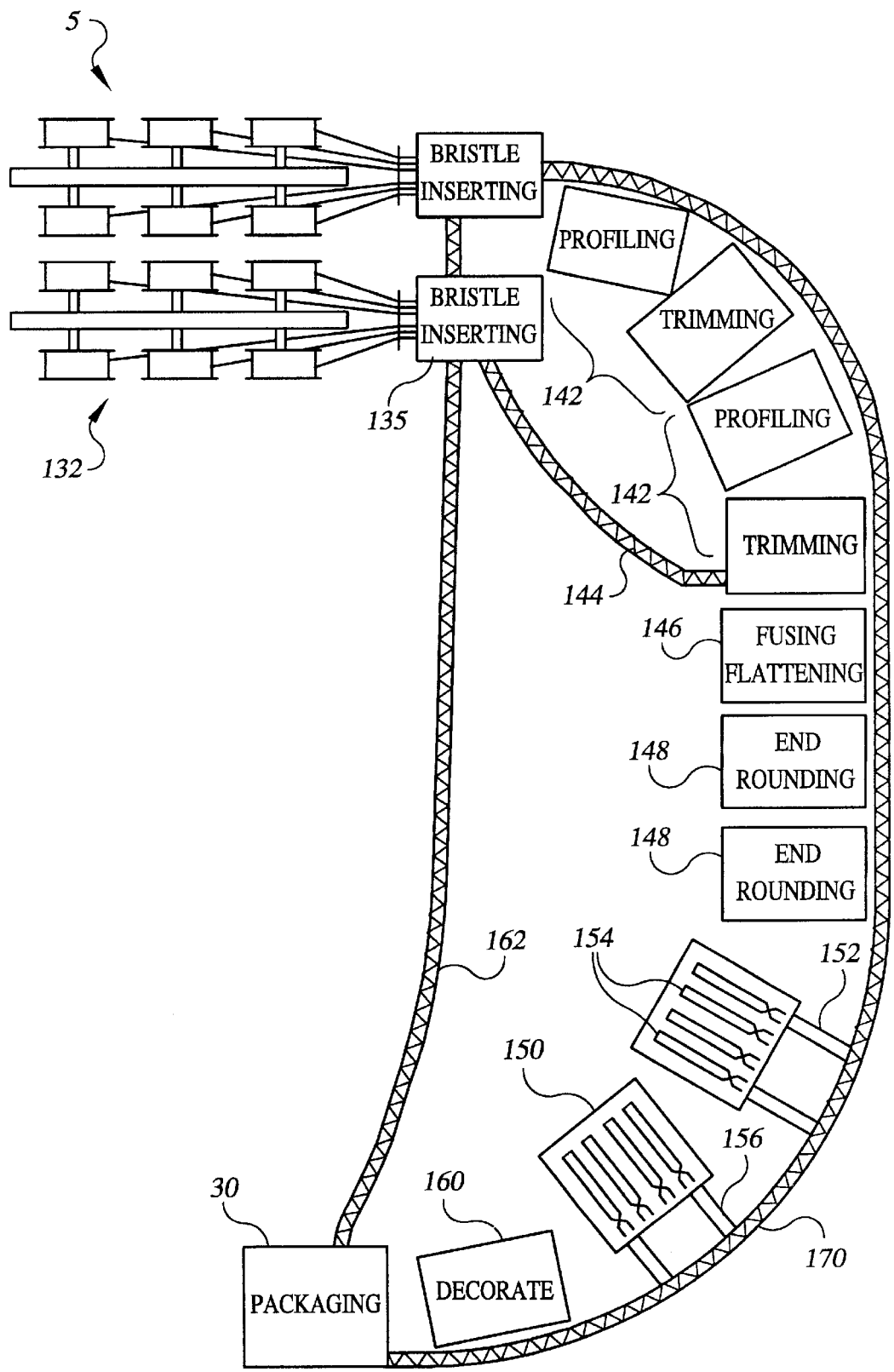
FIG. 3A shows a schematic of an in-mold bristling system according to an embodiment of the invention.

Depending on the relative orientations of the bristle bundles 130 with respect to each other, several profiling station/trimming station pairs 142 may be necessary (FIG. 3A). At each station, the magazine may need to be rotated or tilted, depending on the necessary orientation of the pins with respect to the magazine. Alternatively, the profiling and trimming stations may be oriented relative to the magazine 100. For example, for the brush head 200, separate profiling stations are required for bundle sets 214 and 216.

While the bristle bundles are oriented at a variety of angles in magazine 100, they are parallel to one another as they enter a feed system which directs the bristle bundles 130 into the magazine 100. Thus, the bristle bundles must traverse a corner to pass from the feed system into the magazine. If the angle of the bristle bundles with respect to the face of the magazine 100 is too large, the bristle bundle may jam as it is being fed into the magazine. Thus, it is preferable to include a series of transition plates between the feed system and the magazine. An exemplary design for the transition plates is included in our concurrently filed application entitled, "Method of Bristle Insertion for Brush Production," Ser. No. 09/495,580, filed Feb. 1, 2000, the contents of which are incorporated herein by reference. The transition plates may be mounted to and form part of the feed system. Each plate includes channels which together form a continuous path for the bristle bundle material through the set of plates, much as channels 118 and 122 describe a continuous path through magazine 100. However, in each plate, the channels are oriented at a different angle. For example, the channels in the plate closest to a bristle source may be oriented at 3°, while the next plate in the set is oriented at 6°. Upon emerging from the second set of plates, the bristle bundles will be oriented at 6° with respect to the material entering the feed system. A series of plates can be set up consecutively to transition the bristle bundles over a wide variety of angles, depending on the number of plates and the included angle in each plate.

The magazine 100 then proceeds to a trimming station, whereat the bristle bundles 130 are cut from the mating side of the magazine at the trim plate 124. As can be seen from FIG. 3, the collection of bristle bundles 130 will define a level plane as they protrude into the trim plate 124 and a profiled surface oriented towards the cut plate 120. Because the surface of the trim plate 124 is flat, the cut surface of the bristle bundles 130 also form a flat plane with respect to each other. However, the surface of the trim plate 124, as shown in FIG. 2, is not necessarily flush with the surface of the magazine 100. Thus, when the trim plate 124 is removed, the ends of the bristle bundles 130 are not necessarily in the same plane as the mold side 128 of the magazine 100.

The thickness of the trim plate 124, and, thus, the height at which it protrudes above the surface of the mating plate 128, may be adjusted depending on the properties of the bristle bundle material. As is well known in the art, different materials will lead to different amounts of contraction in the bristle bundles 130 when they are heated and fused. The extent of shrinkage also depends heavily on the diameter of the bristle bundles 130 and coatings which may be present on the individual bristle strands. Some materials may require a large excess length and a thick trim plate 124, while others may not require any excess length at all, allowing the trim plate 124 to lie flush with the surface of the magazine 100.

Figure 7:
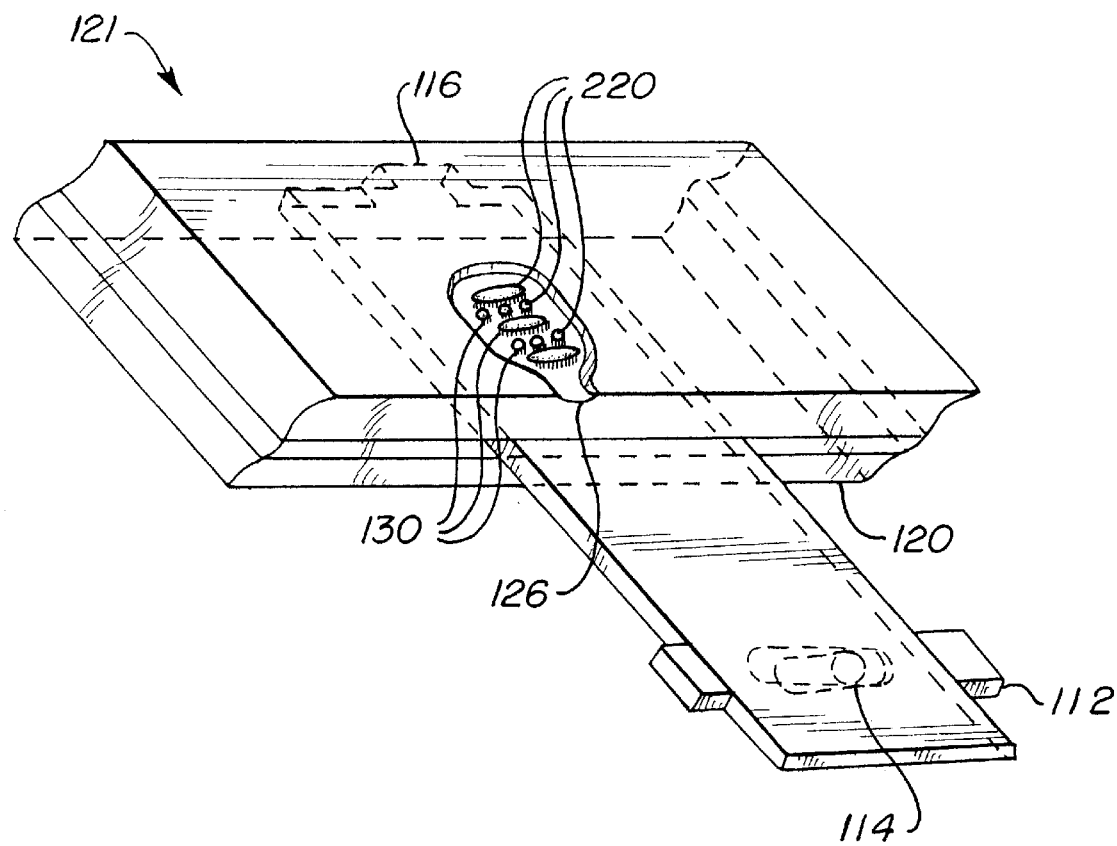
FIG. 7 depicts one unit of the magazine of FIG. 2, wherein the ends of the bristle bundles have been fused.

After the magazine 100 has proceeded to all the profile and trimming stations, the trim plate 124 is removed from the magazine 100 and returned to the beginning of the system 5 by a separate return mechanism, such as conveyor 144 (FIG. 3A). The trimmed ends of the bristle bundles 130, which protrude from the magazine 100 as shown in FIG. 4, are then fused with a non-contact heater at fusing station 146. While it is preferable to heat the bristle bundles 130 with a non-contact heater, it is well known in the art to use contact heaters, chemicals, hot air cannons, or any other technique which will increase flow in the polymer forming the bristles. The heat melts the ends of the bristle bundles 130, and the polymer flows to form small, melted fuseballs 220 at the end of the bristle bundles 130, as shown in FIG. 7.

Figure 8A:
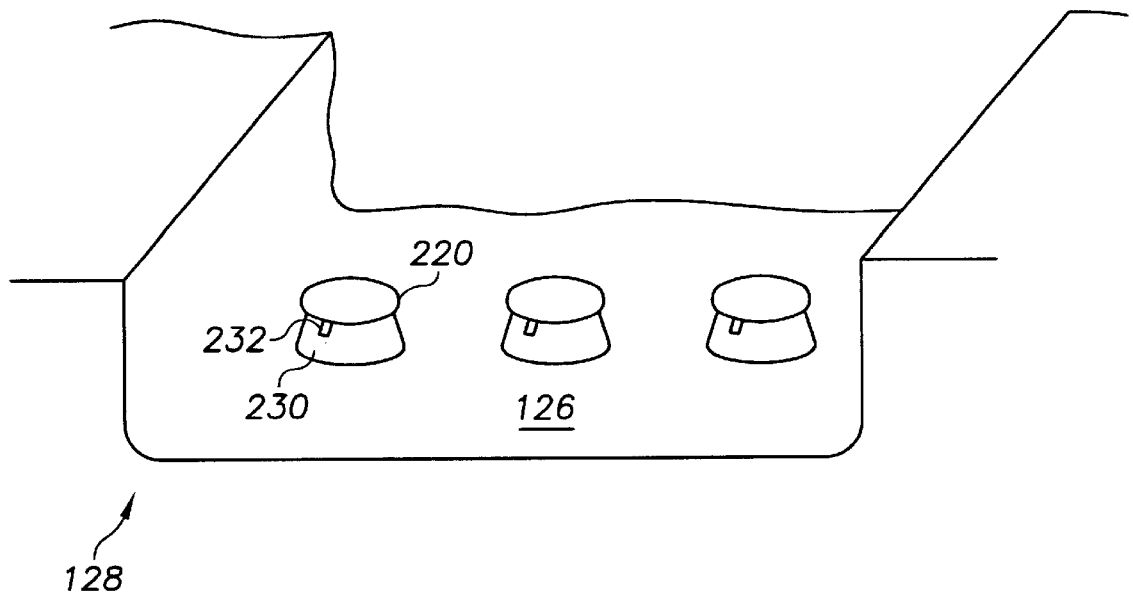
FIG. 8A is a plan view of a mold cavity portion of the magazine, showing a slotted sleeve projecting from the molding surface and the fused end of the bristle bundle pushed onto the sleeve.
Figure 8B:
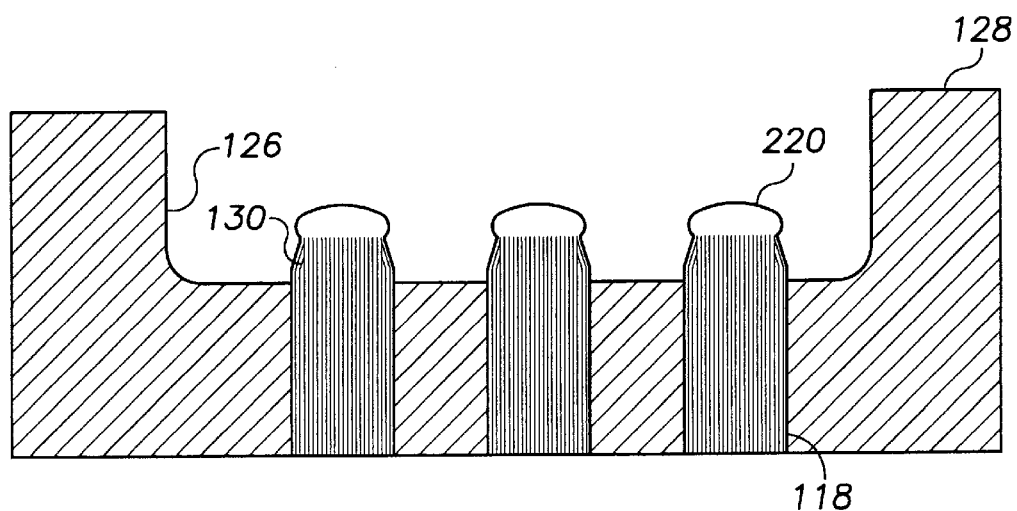
FIG. 8B is a cross-sectional view of the magazine portion of the mold cavity portion depicted in FIG. 8A, showing the relative positioning of the fuse, bristle bundle, and slotted sleeve.
Figure 8C:
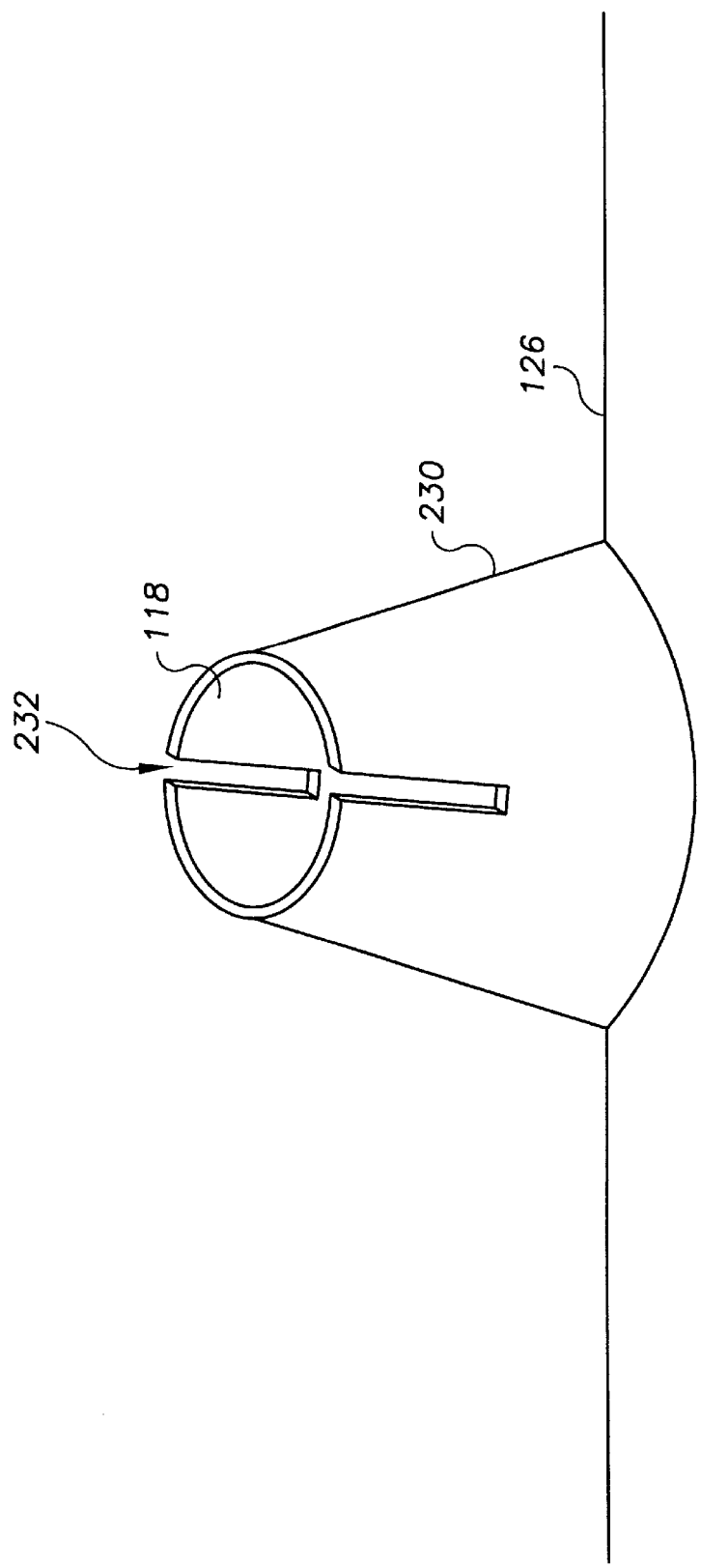
FIG. 8C is a plan view of the slotted sleeve projecting from the surface of the mold cavity portion in the magazine.

The fuses 220 may be pressed against the inside of the mold cavity portion 126. If they are still hot and malleable, e.g., if the magazine is still at fusing station 146 (FIG. 3A), they may also be flattened into a desired shape. The fuses 220 are not actually pushed against the inside surface of the mold cavity portion 126. Instead, they are pushed against small slotted sleeves 230 which protrude from the openings of the individual channels 118 (FIG. 8). FIG. 8A shows the slotted sleeves 230 protruding from the surface of mold cavity portion 126. Fuse 220 has been pushed against the top surface of the sleeve. FIG. 8B shows a cross section of the view in FIG. 8A, wherein the channels 118 and bristle bundles 130 are visible. An individual slotted sleeve 230 on an empty magazine 100 is shown in FIG. 8C. The sleeves 230 each have small slots 232. The purpose of these slots 232 and the sleeves 230 will be explained in connection with the injection molding system.

Figure 9:
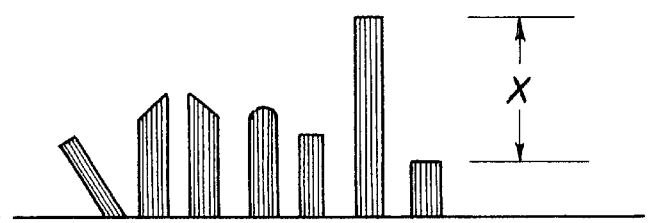
FIG. 9 is a diagram of the different possible heights of the bristle bundles and the bristles within the bundles.

After the bristle bundles 130 have been fused and the fused ends 220 optionally flattened and pushed against the slotted sleeves 230 within the mold cavity portion 126, the other, unmelted, ends of the bristle bundles 130 are end-rounded. These ends will become the use ends of the brush; therefore, they must be processed in order to avoid cutting or overly abrading the gums of the user. Sanders rotating in a circular motion abrade the end of the bristles, rounding the sharp corners of the cut ends. FIG. 9 shows a number of exemplary heights and profiles for the bristle bundles 130. Any combination of these or other profiles may be used in a toothbrush, according to the desires of the manufacturer. If the maximum difference x in height among the bristle bundles 130 is less than 3.2 mm, the ends of the bristles can all be end rounded in a single step. Otherwise, it may be necessary to end-round the bristles in two or more steps at two or more stations 148 (FIG. 3A). At one of the stations, some of the bristles are protected with an insert which prevents them from being overly abraded. Preferably, the longer bristles are shielded during the end rounding of the shorter bristles. In this case, the distance between the bristle ends and the sander is adjusted such that, when the longer bristles are sanded, the shorter bristles do not touch the sander. The use of such inserts is well known to those skilled in the art.

The processed bristles, still clamped into the magazine, are then transported to a mold. A preferred embodiment of the system 5 includes three injection mold machines 150, each having an input queue 152, four injection units 154, and an output conveyor 156 (FIG. 3A). In a preferred embodiment, each injection unit can supply material for two mold cavities. The injection mold machines can be configured to produce brushes having monochromatic or multi-colored handles. However, the invention does not require twelve injection units; it can be practiced with four injection units which may be located on a single injection machine. Alternatively, as will be seen below, it is possible to practice the invention using two injection mold machines, each of which includes either two or four injection units. In any one of the above embodiments, additional injection mold machines, which may in turn include two or more injection units, may be added to the system as required. In a preferred embodiment, each injection unit can inject materials for two brush holding units 121 on the magazine 100 at the same time. The handle of brush 240 (see FIG. 12) is formed in two injection shots, and the operator may choose whether to perform both injections on a single injection mold machine or whether to do the first injection on one machine and the second injection on a second machine. In addition, because each of the twelve injection units can be set up with different colors of the polymer, toothbrushes can be produced in a variety of colors simultaneously. Of course, if only a single color is desired for the handle, only two injection units are necessary for this embodiment. Indeed, depending on the number of components or the number of brush holding units 121 on the magazine 100, it may be desirable to configure the injection unit to supply fewer or more mold cavities or to use fewer or more injection units on a given machine. Alternatively, the handle can be formed in a plurality of injection molding shots to produce a brush with three, four, or more components. Indeed, it is not even necessary to injection mold the entire head of the brush in the first shot. It will be clear from discussion of the various operating modes that additional injection machines can be added to the system, regardless of how many colors or components the final product will have. Additionally, the handle can be compression molded instead of injection molded. In general, the invention is meant to encompass any number of injection mold machines with any number of injection units which in turn may each supply any number of mold cavities. The number and configuration of mold machines and units will be determined by the design of the brush and the capacity of the magazine.

Figure 12A:
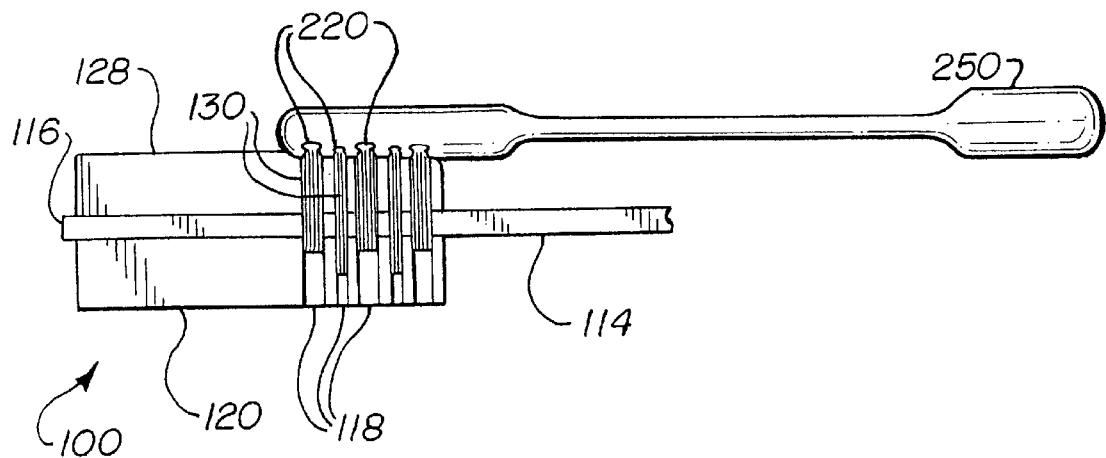
FIG. 12A is a cross-sectional view of the magazine and a partially completed toothbrush.

In general, for the first injection molding shot, the mold cavity portions 126 are mated with complementary mold cavity portions in the first injection mold machine. As noted before, mold cavity portion 126 forms part of the head 200 of the brush 240. The mold cavity portions in the machine, in combination with mold cavity portion 126, define the remainder of brush handle section 250. In a preferred embodiment, the four mold cavities defined by the mating of the portions on the magazine and the machine are supplied by two injection units. Indexing mechanisms such as pins and grooves are used to carefully align the mold cavity portions 126 in magazine 100 with the mold cavity portions in the injection mold machine. The first injection molding shot is typically polypropylene, cellulose acetate propionate (propionate), or polyethylene terephthalate. Other thermoplastics can also be used to practice the invention. Following the first shot, the injection mold machine opens, and the magazine transports the bristle bundles 130 and the newly formed brush handle section 250 to second shot mold with a pick-and-place system or other transport mechanism (FIG. 12A). In a preferred embodiment, the second shot mold includes four mold cavity portions fitted with two additional injection units. It is necessary to ensure that the first section 250 of the brush handle is sufficiently cool and stiff not to sag under its own weight because its center of gravity is not supported by the mold cavity portion 126 in the magazine 100. After the transfer, the magazine 100 is again carefully aligned with the second set of mold cavity portions. This time, the brush handle section 250 itself actually forms a boundary for the molding of the second component 252. The second polymer, typically a thermoplastic elastomer, is then injection molded. When the injection mold machine opens, the entire brush 240 is fully formed and supported by the bristle bundles 130 clamped in the magazine 100. Modules 160 to stamp decorations, paste labels, or otherwise ornament the brushes 240 may be added to the system 5 following the mold units and prior to the release of the brushes 240 (FIG. 3A). It is common to hot stamp an inventory label, such as a date stamp, onto the handles as well. Techniques for ornamenting and labeling brushes are well known in the art. Once brush 240 has been decorated, it is transported to a packaging subsystem 30 and released from the magazine 100. The magazine 100 is returned to the beginning of the production system 5 on a return conveyor 162, and the completed brushes 240 are packaged for transport to the customer. A wide variety of appropriate packaging methods for the invention are well known in the art. For example, brushes can be bulk packed into cartons or placed in individual boxes. An RF sealer may be employed to enclose the brushes in individual blister packs. Additional objects, such as small toys or novelty items, can be co-packaged with the brushes if a form-fill-seal apparatus is used. A flat sheet of plastic is configured to hold the brush and optional toy, which are then loaded into the newly formed pockets in the plastic sheet. A backer, such as a piece of cardboard, is thermally sealed to the plastic, enclosing the brush and other items.

One goal of prior art in-mold bristling techniques is to solve two problems relating to the injection molding of incompletely sealed systems: 1) the release of air from the mold and 2) the prevention of flashing of injection molded material into the face of brush 240. The instant invention is unique in being able to solve these two problems simultaneously. The slot 232 in the sleeve 230 allows air to be pushed out of the mold cavity portion 126 through the channels 118 by the pressure of the injection molded material. However, the slot 232 in the sleeve 230 also allows a small amount of injection molded material to exit the cavity. This injection molded material forms small tabs 242 in the bristle bundles 130 which further helps retain them in the head 200 of the brush 240 (FIG. 10A, bristle bundle 130 shown as outline). FIG. 10B depicts a cross-sectional view of fuse 220 and bristle bundle 130 across tabs 242. For current bristle materials, the fused ends 220 of the bristle bundles 130 are somewhat larger in diameter than the bristle bundles 130. This also facilitates retention because injection molded material flows around the fuses 220 and the narrower bristle bundles 130, obstructing the path of the fused ends 220 through the head 200 of the brush 240. The tabs 242, meanwhile, are large enough to retain the bristle bundles 130 within the brush head 200, but not so large as to appear unsightly to the consumer.

Figures 1, 11A:
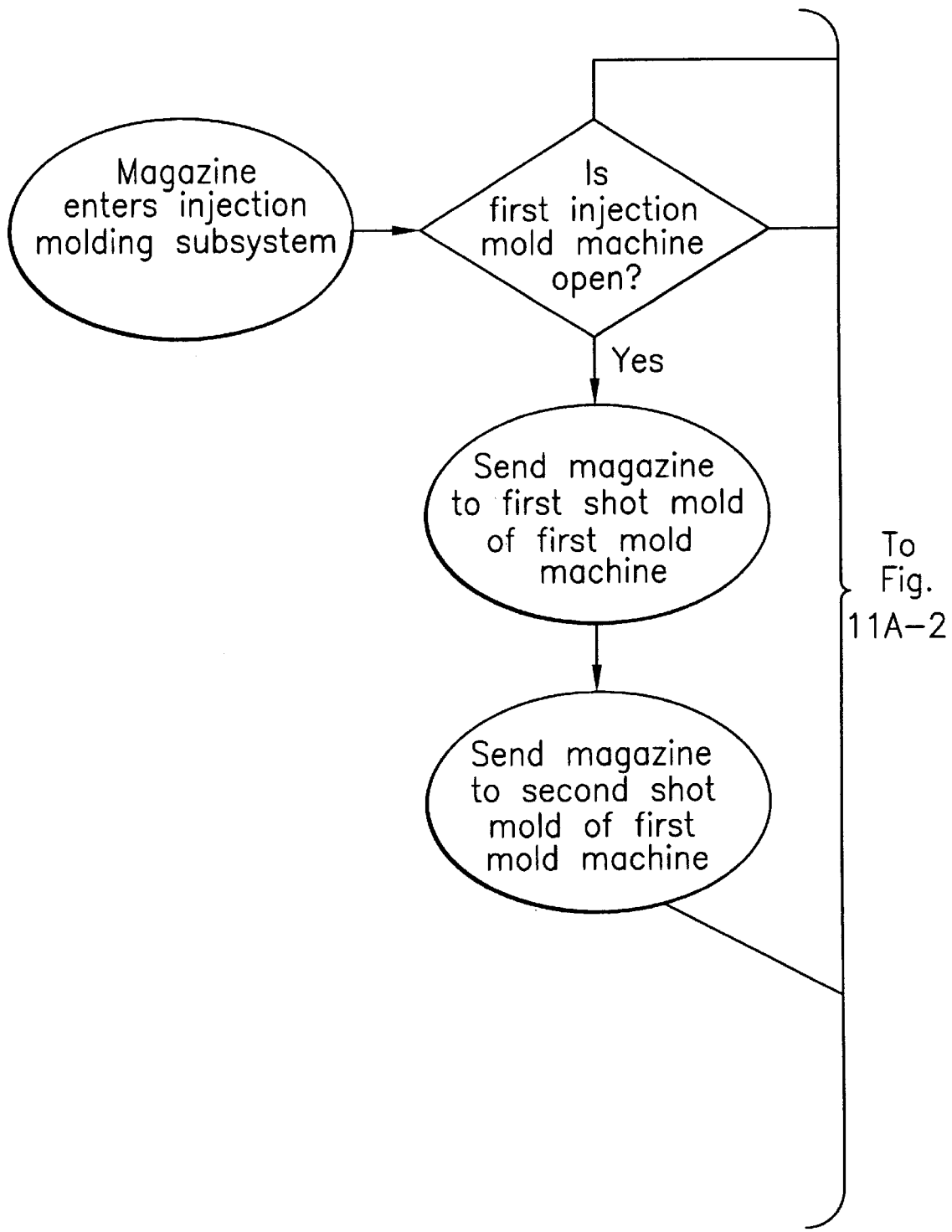
FIGS. 11A and 11B are flow charts of injection molding processes according to the invention.
Figures 2, 11A:
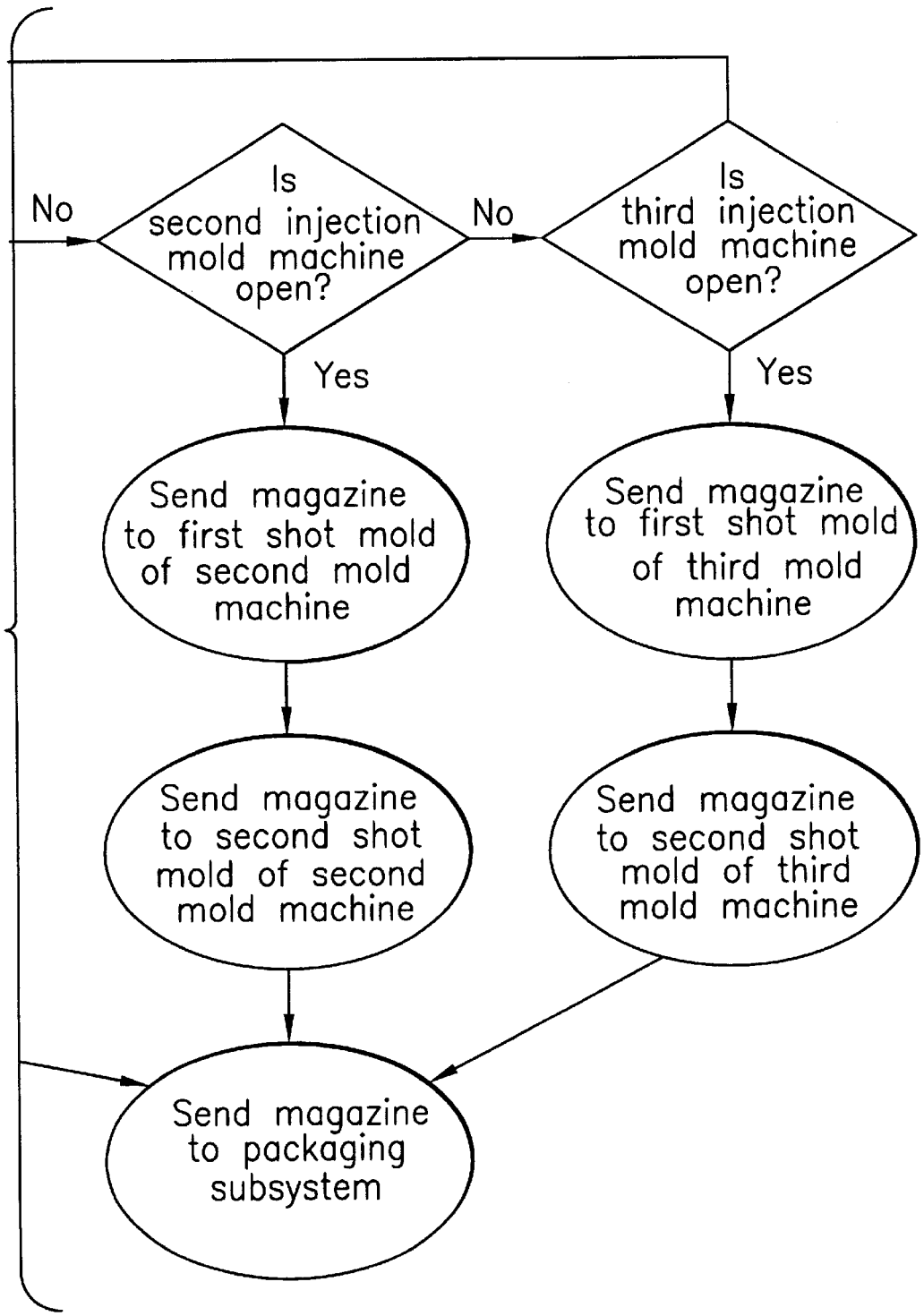
Figure 12B:
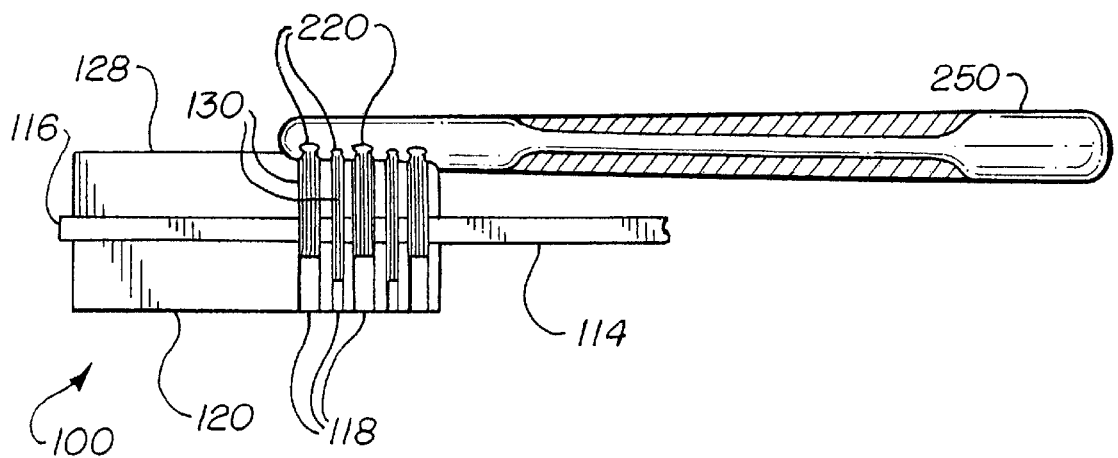
FIG. 12B is a cross-sectional view of the magazine and a completed toothbrush.

As noted above, the molding subsystem 20 of the production system 5 may be operated in two modes. In the first mode, the magazine 100 transports the bristle bundles 130 to a first shot mold in any of the three injection molding machines at which the first component of the toothbrush handle is injection molded (FIGS. 11A and 12A). The magazine 100, carrying a first injection molded section 250 of the brush handle, is then transported to a second shot mold in the same injection mold machine, and a second section 252 of the brush 240 is injection molded (FIG. 12B). The output conveyor 156 takes the magazine 100 to the system conveyor 170, which transports the magazine 100 directly to any intermediate decorating units and then to the packaging subsystem system 30. A computer notes the occupancy of the injection mold machines and directs incoming magazines 100 accordingly to prevent backlogs and congestion and to optimally utilize the mold machines.

Figures 1, 11B:
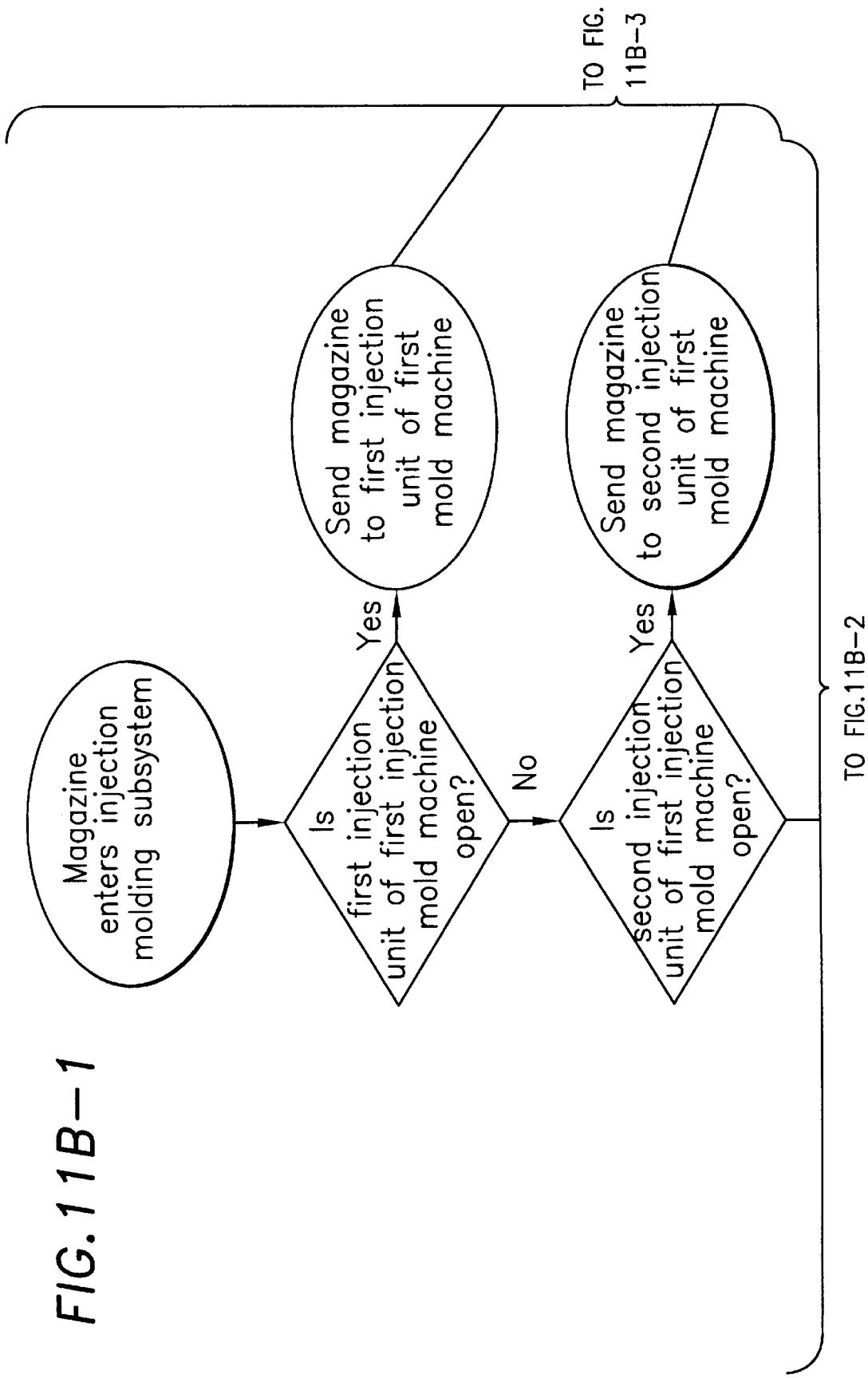
Figures 2, 11B:
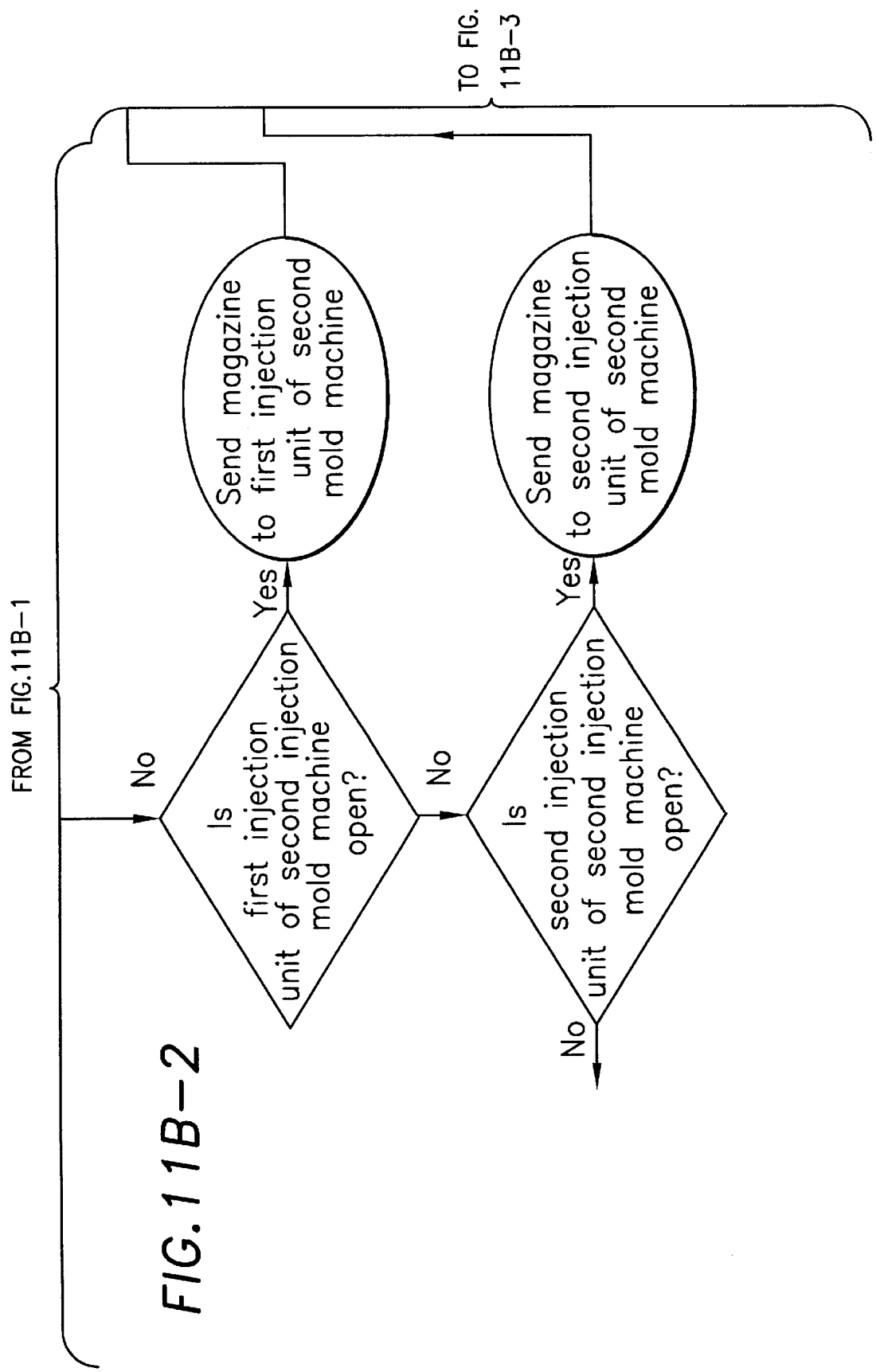
Figures 3, 11B:
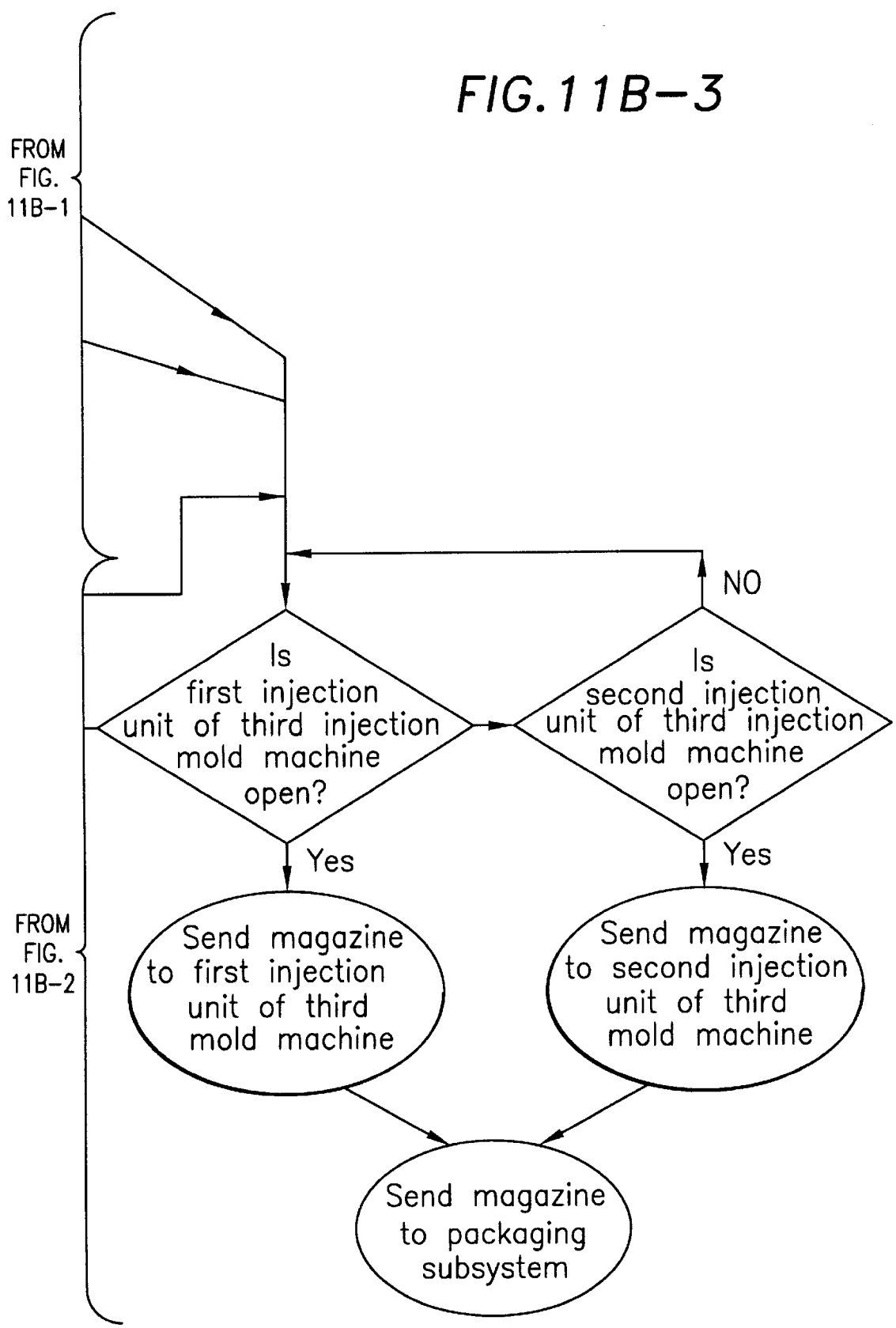

In a second mode, depicted in FIG. 11B, the first two injection mold machines are used to inject the first component 250, and the third injection molding machine is used to inject the second component 252. For the embodiment where a magazine carries four brushes and each injection unit supplies two molds, the computer directs an incoming magazine 100 to either a first or second pair of injection units on either of the first two injection mold machines, depending on their occupancy. After the first component 250 is injected, the magazine 100, carrying the first section 250 of the brush handle, is then directed to one of two second shot molds on the third injection mold machine, each of which, in this embodiment, comprises two injection units. The four pairs of injection units on the first two machines can support two pairs of injection units on the third machine because, for some materials, it will take somewhat longer to injection mold the first component 250 of the handle and allow it enough time to cool so that it does not bend or flex as it is being carried to the third injection mold machine at which the second component 252 is injection molded. As noted above, it may be desirable to configure the injection mold machines to support fewer or greater molds for the first and/or second shot. Again, a computer can be used to direct the incoming magazines among the mold machines. Both of these modes can be adjusted to allow production of brushes with fewer or more components.

The machining of the mold cavity portion 126 of the magazine 100, in addition to the mold cavity portions in the injection mold machines, must be carefully controlled to ensure that the mold cavity portion 126 in the magazine 100 correctly mates with the mold cavity portion for the first injection mold shot and that the first component of the brush handle correctly mates with the mold cavity portion for the second injection mold shot. Careful machining is required to account for the thermal expansion, or, in this case, contraction of the first injection molded component 250. The first component 250 of the brush handle will occupy a slightly larger volume in the first injection unit than it does in the second injection unit because the plastic will shrink as it cools. The amount of shrinkage varies with the polymer that is used to form the handle; thus, the machining must be carefully adjusted for the different polymers that might be used to form the first component of the brush. Different plastics may shrink 3/1000" to 25/1000" per inch as they cool from the molding temperature to a temperature where the handles can be removed from the mold. In addition, different plastics will require different cooling times and different injection molding times, partially dictating which one of the two operation modes a practitioner will use when injection molding the brushes. As will be evident to one skilled in the art, it is possible to end-round the bristles of the brush after the handle has been injection molded.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An apparatus for producing a brush by injection molding, comprising:
    at least one station whereat bristle bundles are fed into channels in a magazine;
    at least one station whereat the relative heights of the bristle bundles in the magazine are adjusted;
    at least one station whereat the non-use ends of the bristle bundles are trimmed in a level plane;
    at least one station whereat the non-use ends of the bristle bundles are fused,
    at least one station whereat the use ends of the bristle bundles are end-rounded;
    at least a first injection unit; and
    a conveyor which transports the magazine to the different stations,
    wherein at least a portion of the magazine forms part of a mold cavity in the first injection unit.

2. The apparatus of claim 1, wherein the level plane is defined by a trim plate in cooperation with the magazine.

3. The apparatus of claim 2, further comprising a return conveyor to return the trim plate to an unfilled magazine.

4. The apparatus of claim 1, wherein the bristle bundles are fed into the magazine from an endless supply.

5. The apparatus of claim 4, wherein the endless supply comprises a creel system.

6. The apparatus of claim 1, wherein the bristle bundles are fed into the magazine from a pre-cut supply of bristles.

7. The apparatus of claim 1, wherein the relative heights of the bristle bundles are adjusted by pins entering the magazine from a first side and a second side.

8. The apparatus of claim 7, wherein the magazine is not perpendicular to the pins.

9. The apparatus of claim 7, wherein an end surface of at least a portion of the pins is not perpendicular to a longitudinal axis of said pins.

10. The apparatus of claim 1, wherein the station whereat the relative heights of the bristle are adjusted comprises:
    an insert comprising holes in an arrangement corresponding to the configuration of the bristle bundles in the magazine, wherein each hole ends in a surface corresponding to a desired arrangement of bristle strands or the inverse of the desired arrangement of bristle strands;
    placing means to bring the insert into contact with the magazine such that the channels are coaxially aligned with the holes; and
    a source of pressurized air configured to be in fluidic communication with the channels such that the bristle bundles are interposed between the source of pressurized air and the holes.

11. The apparatus of claim 1, wherein the relative heights of the individual bristles within the bristle bundles are adjusted at the station whereat the relative heights of the bristle bundles are adjusted.

12. The apparatus of claim 1, wherein some of the bristle bundles are skewed with respect to each other.

13. The apparatus of claim 1, wherein some of the bristle bundles lie in intersecting planes.

14. The apparatus of claim 1, comprising at least two stations whereat bristle bundle heights are adjusted and two stations whereat the bristle bundles are trimmed, wherein the height adjustment stations and trimming stations alternate, such that at least some of the bristle bundles are trimmed before the magazine enters the second height adjustment station.

15. The apparatus of claim 1, further comprising a station whereat the fused ends of the bristle bundles are pressed against a portion of the magazine.

16. The apparatus of claim 1, further comprising a station whereat the fused ends of the bristle bundles are flattened.

17. The apparatus of claim 1, wherein the apparatus includes a plurality of injection units and wherein the plurality of injection units are configured such that the brush is produced from at least two different polymers.

18. The apparatus of claim 1, further comprising a plurality of injection molding machines.

19. The apparatus of claim 18, wherein each injection molding machine includes a plurality of injection units.

20. The apparatus of claim 18, wherein the injection molding machines are configured such that the brush is produced from at least two different polymers.

21. The apparatus of claim 1, further comprising a packaging system for the completed brush.

22. The apparatus of claim 1, further comprising a return conveyor for the used magazine.

23. The apparatus of claim 1, further comprising a station whereat the brush can be ornamented or labeled.

24. The apparatus of claim 1, further comprising stations whereat the relative heights of the bristle bundles are adjusted prior to or subsequent to the end-rounding station.

* * * * *